UNITED STATES PATENT OFFICE.

JOHN MEYENBERG, OF BUENAPARK, CALIFORNIA.

PROCESS OF PREPARING FOODS.

SPECIFICATION forming part of Letters Patent No. 677,159, dated June 25, 1901.

Application filed January 6, 1900. Renewed November 10, 1900. Serial No. 36,085. (No specimens.)

*To all whom it may concern:*

Be it known that I, JOHN MEYENBERG, a citizen of the United States, residing in Buenapark, in the county of Orange and State of California, have invented certain new and useful Improvements in Processes of Producing a Food Product For Infants and Invalids, of which the following is a specification.

This invention relates to an improved process of making a food or alimentary preparation for infants, invalids, and others in which are combined the nutritious constituents of cow's milk and a suitable cereal; and the invention consists in removing the cream from cow's milk, removing the casein from the resulting skimmed milk, boiling the whey thus obtained with a dry crushed unmalted cereal, filtering the resulting solution of whey and cereal extract, steeping the boiled grains in water, adding the gruel thus obtained to the solution of whey and cereal extract, boiling the mixture, adding to the same a quantity of fresh cream and sugar and a quantity of fresh-boiled cow's milk from which the cream and casein has not been removed, gradually heating the entire mixture to 175° Fahrenheit, and finally concentrating the same.

In carrying out my improved process of making a pure food product suitable for infants and invalids fresh cow's milk is employed. From the entire quantity of milk taken, which may be, for example, one thousand two hundred pounds, the cream (about one hundred and eighty pounds) is removed in any suitable manner, and from the resulting skimmed milk, which, allowing for any small losses in the process, may be placed at one thousand pounds, the casein (one hundred and ten pounds) is separated. The whey (say, eight hundred and ninety pounds) remaining after the separation of the casein is then heated to boiling temperature. To this eight hundred and ninety pounds of boiling whey is added about one and one-half to two per cent. (twelve to twenty pounds) of a dry, rolled, or crushed unmalted cereal—such as oats, barley, or wheat. The boiling of the whey is continued until the nutritious constituents of the cereal are extracted from the grains and dissolved in the whey. The solution is then filtered through a suitable cloth, which retains the boiled grains, together with any traces of casein which may not have been removed in the step of removing the casein from the skimmed milk. The mass of boiled grain acts as a filter for retaining any such remaining casein. The grains are then steeped in boiling water, (preferably distilled water,) so as to dissolve any remaining traces of their nutritive constituents. It is found that in practice this steeping yields a gruel containing much of nutritive value, it appearing that the valuable constituents of the grain employed are not entirely extracted by the first boiling in the whey, but that a further and valuable extract is obtained by a subsequent steeping in water. The gruel formed by the steeping of the grains in water is then filtered off, leaving behind the worthless bran of the grain. To the solution of whey and cereal extract first obtained this gruel is now added and the mixture well boiled for some time. It is then mixed with a quantity (about three hundred pounds) of fresh-boiled milk from which the cream and casein have not been removed. It is preferable to add at this stage of the process a quantity of cream about equal to that originally removed, (one hundred and eighty pounds,) thereby increasing the proportion of fat in the food. A small quantity of sugar—say two and one-half per cent. or about thirty pounds—for sweetening the mixture is also preferably added at this stage. The solution is then gradually heated to 175° Fahrenheit or over, after which the milk is transferred into a suitable heating apparatus which is connected with the vacuum-pan, in which apparatus it is subjected to heat above the boiling-point, so that a preliminary sterilization of the uncondensed milk is obtained before the same is transferred to the vacuum-pan. By this preliminary heating any bacilli which may be contained in the milk are killed, and as the heating apparatus is connected directly with the vacuum-pan the formation of new bacilli is prevented. The milk is then drawn off into the vacuum-pan and concentrated therein to the required consistency. When the latter is reached, the product is drawn off into jars or tins and sterilized in the usual manner.

My improved food product contains the nutritious constituents of the milk and cereal employed and can be used as a food in the same manner as condensed milk, being easily digested by infants and invalids and can be preserved for any length of time.

Having thus described my invention, I claim as new and desire to secure by Letters Patent—

The process herein described of preparing a food product for infants and invalids, which consists of the following steps: removing the cream from cow's milk, removing the casein from the resulting skimmed milk, boiling the whey thus obtained with a dry, crushed, unmalted cereal, filtering the resulting solution of whey and cereal extract, steeping the boiled grains in water, adding the gruel thus obtained to the solution of whey and cereal extract, boiling the mixture, adding to the same a quantity of fresh cream and sugar and a quantity of fresh-boiled cow's milk from which the cream and casein have not been removed, gradually heating the entire mixture to 175° Fahrenheit, and finally concentrating the same, substantially as set forth.

In testimony that I claim the foregoing as my invention I have signed my name in presence of two subscribing witnesses.

JOHN MEYENBERG.

Witnesses:
H. B. MADESON,
O. G. CAVANAUGH.